US009767019B2

(12) United States Patent
Flood (10) Patent No.: US 9,767,019 B2
(45) Date of Patent: Sep. 19, 2017

(54) PAUSELESS GARBAGE COLLECTOR WRITE BARRIER

(71) Applicant: Red Hat, Inc., Raleigh, NC (US)

(72) Inventor: Christine H. Flood, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 843 days.

(21) Appl. No.: 14/029,544

(22) Filed: Sep. 17, 2013

(65) Prior Publication Data
US 2015/0081996 A1 Mar. 19, 2015

(51) Int. Cl.
G06F 12/00 (2006.01)
G06F 12/02 (2006.01)
G06F 9/44 (2006.01)

(52) U.S. Cl.
CPC ........ *G06F 12/0269* (2013.01); *G06F 9/4428* (2013.01); *G06F 2212/1008* (2013.01)

(58) Field of Classification Search
CPC ................................ G06F 9/50; G06F 12/023
See application file for complete search history.

(56) References Cited

U.S. PATENT DOCUMENTS

| 6,526,422 | B1 * | 2/2003 | Flood ................ G06F 12/0269 |
| 6,999,980 | B2 | 2/2006 | Detlefs et al. |
| 7,584,232 | B2 | 9/2009 | Guo |
| 8,024,505 | B2 | 9/2011 | Dahlstedt et al. |
| 8,429,658 | B2 | 4/2013 | Auerbach et al. |
| 9,047,334 | B1 * | 6/2015 | Cheriton ........... G06F 17/30371 |
| 2004/0186863 | A1 | 9/2004 | Garthwaite |
| 2008/0281886 | A1 * | 11/2008 | Petrank ............... G06F 12/0269 |
| 2009/0327374 | A1 * | 12/2009 | Wright ................ G06F 12/0269 |
| 2011/0264713 | A1 * | 10/2011 | Ylonen ............... G06F 12/0269 707/818 |
| 2012/0222005 | A1 | 8/2012 | Harris et al. |
| 2013/0185337 | A1 * | 7/2013 | Lipcon ............. G06F 17/30138 707/813 |

OTHER PUBLICATIONS

H. Gao et al.("A general lock-free algorithm using compare and swap", Elsevier, pp. 225-241).*

(Continued)

*Primary Examiner* — David X Yi
*Assistant Examiner* — Arvind Talukdar
(74) *Attorney, Agent, or Firm* — Haynes and Boone, LLP (57) ABSTRACT

An example method of managing memory includes identifying a first object of the first type to update, the first object being stored on a heap. The method also includes reading a first memory address stored in a second object of the second type and storing a copy of the first object at a second memory address. The first memory address is an initial memory address of the first object. The method further includes after the copy is stored, reading a third memory address stored in the second object. The third memory address is a current memory address of the first object. The method also includes determining whether the first memory address matches the third memory address, and when the first memory address is determined to match the third memory address, updating the first memory address stored in the second object with the second memory address.

19 Claims, 7 Drawing Sheets

(56) References Cited

OTHER PUBLICATIONS

Cliff Click, Gil Tene and Michael Wolf; "The Pauseless GC Algorithm;" Jun. 11-12, 2005; pp. 46-56; Azul Systems, Inc.
Minoru Nakamura; "Pauseless GC of Network Attached Processing;" Nov. 12, 2005; pp. 1-9; http://www.nminoru.jp/~nminoru/java/cms/pauseless_gc.html.
CLFF Click; "Azul and Open Source;" Azul Systems; www.azulsystems.com/blogs.

\* cited by examiner

PAUSELESS GARBAGE COLLECTOR WRITE BARRIER

FIELD OF DISCLOSURE

The present disclosure generally relates to memory management, and more particularly to garbage collection.

BACKGROUND

In the field of computer systems, a program may allocate memory for objects from a free memory area called a heap. Memory is allocated to, and freed from, the heap. Eventually, when the objects are no longer being referenced by the program, the memory allocated for the created objects is reclaimed through a garbage collection process. Garbage collection may refer to a process of identifying unused areas of main memory storage. The garbage collection process clears the objects from memory, and the once allocated memory is again available for use.

Modern programs may dynamically generate objects that are stored on the heap. Although different uses of the term may exist, the discussion that follows will use heap to refer to shared memory managed by automatic garbage collection. The garbage collector has control of and/or direct access and/or knowledge of the addresses, classes, roots, and other such detailed information about all live objects created in the system. After an object is no longer needed, it is desirable to reclaim the memory allocated to the object to prevent the system from running out of memory as more temporary objects fill the heap. Garbage collectors operate by reclaiming space that is no longer "reachable."

In some systems, which are usually known as "object oriented," objects may have associated methods that are routines that can be invoked by reference to the object. An object may belong to a class, which is an organizational entity that may contain method code or other information shared by all objects belonging to that class. In the discussion that follows, though, the term object will not be limited to such structures; it will additionally include structures with which methods and classes are not associated.

BRIEF SUMMARY

This disclosure relates to memory management. Methods, systems, and techniques for managing memory are disclosed.

According to an embodiment, a system for managing memory includes a memory including a heap. The heap is partitioned into a plurality of regions and stores a set of objects of a first type and a set of objects of a second type. The plurality of regions includes a target collection region and a destination region. The system also includes a comparison module that identifies a first object of the first type to evacuate from the target collection region to the destination region, reads a first memory address stored in a second object of the second type, and stores a copy of the first object at a second memory address in the destination region. The first memory address is an initial memory address of the first object located in the target collection region. After the copy of the first object is stored, the comparison module reads a third memory address stored in the second object and determines whether the first memory address matches the third memory address. The third memory address is a current memory address of the first object. The system also includes an update module that when the first memory address is determined to match the third memory address, updates the first memory address stored in the second object with the second memory address.

According to another embodiment, a method of managing memory includes identifying a plurality of regions in a heap storing one or more objects of a first type and one or more objects of a second type. Each object of the second type stores a memory address of an object of the first type. The method also includes identifying a first object of the first type to update. The first object is stored on the heap. The method further includes reading a first memory address stored in a second object of the second type. The first memory address is an initial memory address of the first object. The method also includes storing a copy of the first object at a second memory address. The method further includes after the copy is stored, reading a third memory address stored in the second object. The third memory address is a current memory address of the first object. The method also includes determining whether the first memory address matches the third memory address. The method further includes when the first memory address is determined to match the third memory address, updating the first memory address stored in the second object with the second memory address.

According to another embodiment, a non-transitory machine-readable medium including a plurality of machine-readable instructions that when executed by one or more processors is adapted to cause the one or more processors to perform a method including: identifying a plurality of regions in a heap storing one or more objects of a first type and one or more objects of a second type, each object of the second type storing a memory address of an object of the first type; identifying a first object of the first type to update, the first object being stored on the heap; reading a first memory address stored in a second object of the second type, the first memory address being an initial memory address of the first object; storing a copy of the first object at a second memory address; after the storing, reading a third memory address stored in the second object, the third memory address being a current memory address of the first object; determining whether the first memory address matches the third memory address; and when the first memory address is determined to match the third memory address, updating the first memory address stored in the second object with the second memory address.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
　A. Allocated Objects Stored on the Heap
　　1. Header Fields and Application-Specific Data in Shared Object
　　2. Reference Object References Shared Object
　B. Write Barrier
III. Example Diagrams of Race Condition
　A. Object is Stored in a Target Collection Region of the Heap
　B. Copy the Object to a Destination Region of the Heap
　C. Thread 320 Wins the Race
　　1. Thread 320 Updates the Memory Address Stored in the Reference Object
　　2. Thread 320 Updates the Shared Object in the Destination Region
　　3. Thread 320's Last-Known Memory Address of the Shared Object
　　4. Thread 320 Stores a New Reference Object in the Destination Region
　　5. Thread 322 Uses Thread 320's Copy in the Destination Region
　D. Thread 320 Loses the Race
　　1. Thread 322 Updates the Memory Address Stored in the Reference Object
　　2. Thread 320 Uses Thread 322's Copy in the Destination Region
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of modules and arrangements are described below to simplify the present disclosure. These are, of course, merely examples and are not intended to be limiting.

Many software applications rely on a managed runtime, a software component that provides services to manage an application's use of specific hardware resources. Common benefits of employing a managed runtime may be that the task of the application developer is simplified, portability to different hardware is provided, and the available resources (e.g., memory) are better used. Managed runtimes may implement one or more garbage collectors, allowing an application to be run with the one whose cost-benefit trade-off best suits the needs of the application. Different garbage collectors with widely varying costs and benefits exist. The present disclosure may be used in relation to a managed runtime that supports the use of multiple, alternative garbage collectors. This is not intended to be limiting, and it should be understood that the present disclosure may also be used in relation to a managed runtime that supports the use of a single garbage collector that can benefit from and use the techniques presently disclosed.

A managed runtime may be a virtual machine. An example of a managed runtime is a JAVA® virtual machine (JVM) such as OPENJDK®. Trademarks are the property of their respective owners. OPENJDK® JVM supports the use of multiple, alternative garbage collectors. The standard unit of allocation for a garbage collector is a single application data record and may be referred to as an object. The garbage collector may record management information that helps the garbage collector manage the objects in use and also manage the memory that is available for allocation.

It may be desirable to allow garbage collector threads and mutator threads of application 106 to run concurrently. The term mutator may be used to distinguish the part of the program that does "useful" work from that which does the garbage collection. Executing both types of threads concurrently may eliminate or greatly reduce user observable garbage collector pause times. This is in contrast to other garbage collection approaches that rely on stopping the mutator threads while performing garbage collection. This "stop-the-world" scenario allows the garbage collector to evacuate objects from a target collection region of the heap to a destination region of the heap, and then update the mutator threads so that they point to the relocated objects in the destination region. During the "stop-the-world" phase, the mutator threads are halted.

In allowing garbage collector and mutator threads to run concurrently, a mutator thread may attempt to update an object that a garbage collector thread is about to evacuate or has already evacuated from the target collection region to a destination region of the heap. If the garbage collector thread has already evacuated the object to the destination region, the mutator thread's update to the object may be lost because the update was made to the object located in the target collection region. In another example, a first mutator thread may attempt to update an object that a second mutator thread is about to update, evacuate, or has already evacuated from the target collection region to a destination region of the heap. As such, the first mutator thread's update to the object may be lost because the update was made to the object located in the target collection region.

The present disclosure provides techniques to enable multiple concurrently executing threads to update an object while avoiding updates to an object from being lost. In an embodiment, a write barrier ensures that all updates to an object located in a target collection region of the heap are performed in a destination region of the heap. This may ensure that all updates to an object are made to the same object and that the object's data are consistent.

II. Example System Architecture

Figure 1:
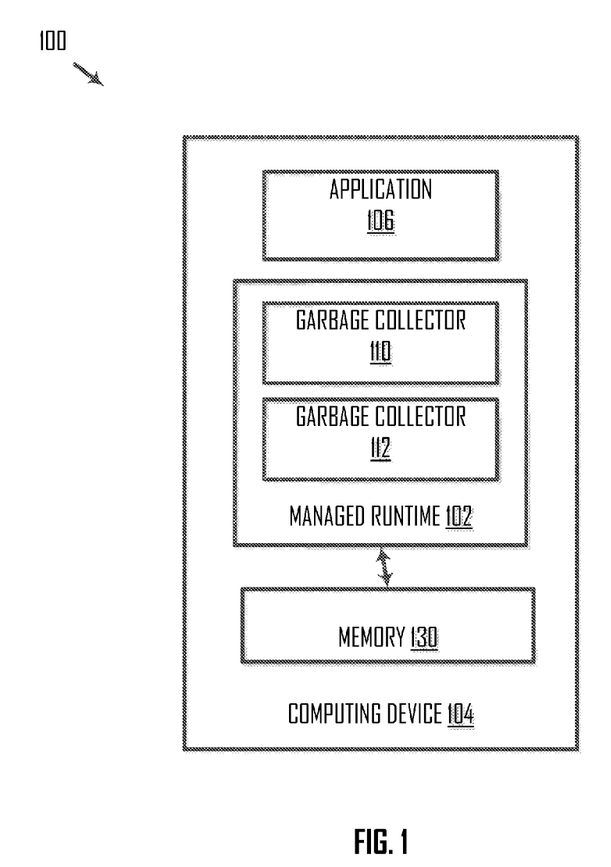
FIG. 1 is a simplified block diagram illustrating a system for managing memory, according to an embodiment.

FIG. 1 is a simplified block diagram 100 illustrating a system for managing memory, according to an embodiment. Diagram 100 includes a managed runtime 102 that executes on a computing device 104. Computing device 104 may be a workstation, computer, server, game console, set-top box, kiosk, embedded system, mobile device (e.g., a mobile phone, personal digital assistant, tablet, and laptop), or other device having at least one processor and memory.

Managed runtime 102 may be a software program that communicates with an application 106 executing on computing device 104. Managed runtime 102 may include a garbage collector 110, 112 that is responsible for managing the memory resources of the hardware. A garbage collector may allocate areas of memory 130 to application 106 on demand, and when the memory area is no longer in use by the program, reclaim the memory area for reuse. Memory 130 may include a free memory area called a heap, and application 106 may dynamically generate objects that are stored on the heap.

Garbage collectors 110 and 112 may be present in the delivered program binary. In an example, only one of garbage collectors 110 and 112 is selected to operate in any given program run. In another example, a plurality of garbage collectors (e.g., garbage collectors 110 and 112) are selected to operate in any given program run. The plurality of garbage collectors may execute concurrently during a single program run, each managing objects allocated from its own subset of the heap. In an example, different garbage collectors may be used to provide more or less timely allocation for different categories of applications if managed runtime 102 were used to support deployment of a suite of applications.

A. Allocated Objects Stored on the Heap

Figure 2:
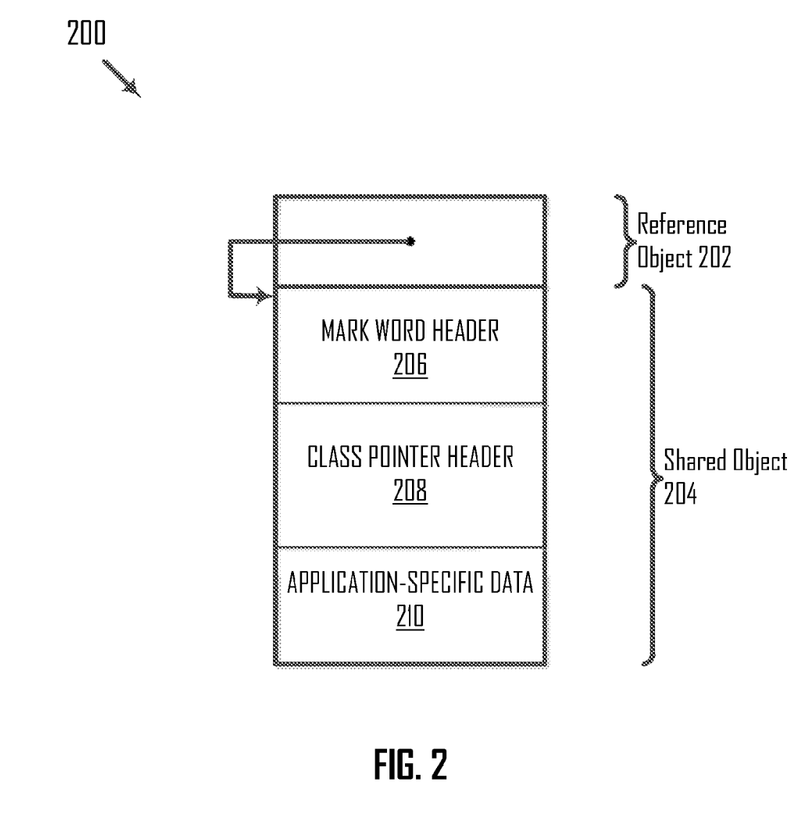
FIG. 2 is a diagram illustrating a reference object and a shared object, according to an embodiment.

FIG. 2 is a diagram 200 illustrating a reference object 202 and a shared object 204, according to an embodiment. Memory may be allocated from the heap for reference object 202 and shared object 204. Shared object 204 includes a set of headers (e.g., mark word header 206 and class pointer header 208) and application-specific data 210. Although two headers are illustrated, other embodiments having more or fewer than two headers are within the scope of this disclosure. Further, it should be understood that a header may store management data different from that described in the disclosure.

1. Header Fields and Application-Specific Data in Shared Object

A header may be included in all allocated objects and may be unused by the application for which the object is allocated. Rather, the header may be used by the managed runtime to manage the application-specific data to ensure proper and consistent execution of the application (e.g., the application can manipulate fields within shared object 204). It may be beneficial to store the set of headers at the front of shared object 204 so that application-specific data 210 starts at the same location in each shared object. As such, application-specific data 210 in shared object 204 are located at a fixed offset from the start of the shared object. Two shared objects allocated for the same application or different applications may include the same set of header fields but different application-specific data.

In FIG. 2, mark word header 206 and class pointer header 208 are management data that may be used by managed runtime 102 to manage application-specific data 210. Mark word header 206 may be used by garbage collector 110 when it is scanning memory for unused objects to mark objects that have been visited. Mark word header 206 may include a mark/lock word that enables a thread to mark shared object 204 as live and/or information about locking shared object 204 so that another thread is unable to write to shared object 204. Mark word header 206 may also include a unique identifier that identifies shared object 204. The unique identifier may be implemented as, for example, a hashtag.

Class pointer 208 may include the address of a class record describing shared object 204 and, amongst other things, may identify the size of the shared object. In an example, class pointer header 208 includes a class pointer that specifies the object type of shared object 204. Each object (e.g., reference object 202 and shared object 204) in a program is an object of a specific type defined by a program (e.g., the application or virtual machine). Managed runtime 102 may determine based on the object's type what operations may be performed on the object, how to perform operations on the object, and what information is stored in the object.

Application-specific data 210 may refer to data that is defined by and used by application 106. Application-specific data 210 is specific to application 106 for which shared object 204 is allocated. Shared object 204's state may be described as its fields and properties. In an example, application-specific data 210 may include one or more fields. A field may be, for example, a count, a number that represents a cost, or a pointer that identifies text that specifies a person's name in application 106.

2. Reference Object References Shared Object

Object 202 may reference object 204 and be co-located with object 204 on a region of the heap. In an embodiment, reference object 202 may be located at a memory address adjacent to and preceding shared object 204. For example, reference object 202 may be a word that precedes shared object 204 and includes the garbage collector-specific data (e.g., forwarding-pointer field). The reference may be represented as a pointer to object 204 or as a memory address of object 204. In an example, reference object 202 may be an object handle that references shared object 204. Although reference object 202 is described as storing a memory address of shared object 204, it should also be understood that the reference object may store a pointer to the shared object.

Reference object 202 is separate from shared object 204. A benefit of having reference object 202 separate from shared object 204 may be that the format of the shared object is unchanged and is compatible with other garbage collectors, third-party debugging and performance monitoring tools, and object serialization while still allowing a write barrier. Thus, it may be unnecessary to change the application code or the runtime code. Additionally, the separate reference objects support a multi-threaded environment and enable one or more threads to update the shared objects while they are being marked and/or evacuated from a target collection region to a destination region of the heap.

B. Write Barrier

When a thread updates a shared object stored in the target collection region, a write barrier may be enforced such that all updates to shared objects occur in the destination region. Accordingly, a thread that wants to update a shared object that is stored in a target collection region copies the shared object to a destination region of the heap and updates the shared object in the destination region.

A thread that identifies a shared object located in a target collection region to update or evacuate may read an initial memory address of the shared object stored in the target collection region and store a copy of the shared object in the destination region of the heap. Each thread that wants to update the shared object and/or evacuate the shared object from the target collection region to the destination region may concurrently perform with other threads this indirect reading of the initial memory address of the shared object in the target collection region and also storing of the respective thread's own copy of the shared object in the destination region. Before each thread stores a copy of the shared object in the destination region, the respective thread may read the memory address stored in reference object 202 to determine the initial memory address of shared object 204. These threads may compete to update the memory address stored in reference object 202 so that it stores the memory address of the shared object copy made by that particular thread.

A read barrier may be enforced to ensure that a mutator thread reads from the most up-to-date location of the shared object. For example, the thread may read reference object 202, which includes the reference to shared object 204, to determine the current memory address of shared object 204 before reading shared object 204. A read barrier is described in prior U.S. patent application Ser. No. 14/018,279 to Flood et al., filed Sep. 4, 2013, entitled "Non-Intrusive Storage of Garbage Collector-Specific Management Data," which is incorporated herein by reference in its entirely.

A race condition may occur in which the first thread to update reference object 202 to store the new memory address of that particular thread's copy in the destination region is the one to have its copy as the new shared object. Any threads that lose the race will realize that shared object 204 is no longer in the target collection region and is now in the destination region of the heap and will use the winning thread's shared object copy in the destination region. These threads and any other threads that subsequently attempt to read or update shared object 204 may determine the most up-to-date memory address of shared object 204 by reading the memory address stored in reference object 202. In this way, threads may synchronize with each other to agree on where an object lives and any threads attempting to update shared object 204 write to the same copy, thus preventing the loss of updates to shared object 204.

The thread identifies the initial memory address of shared object 204 in the target collection region (before the thread stores a copy of shared object 204 in the destination region) and identifies the current memory address of shared object 204 stored in reference object 202 (after the thread stores a copy of shared object 204 in the destination region). In an example, the thread executes a compare-and-swap (CAS) atomic instruction on reference object 202 that compares the identified initial memory address to the identified current memory address, and when the initial memory address is determined to match the current memory address, the thread updates the initial memory address stored in reference object 202 with the memory address of the thread's shared object copy in the destination region. When the initial memory address is determined to not match the current memory address, the thread lost the race and is given the new memory address of the winning thread's copy of the shared object in the destination region. The CAS atomic instruction may be a hardware primitive that a plurality of threads execute.

A thread that accesses shared object 204 before the memory address in reference object 202 is changed reads the old copy of shared object 204 stored in the target collection region. In contrast, a thread that accesses shared object 204 after the memory address in reference object 202 is changed reads the new copy of shared object 204 stored in the destination region. The thread may read from or write to the new shared object copy in the destination region.

Example pseudocode for the write barrier with explanatory comments is set forth below:

```
write_ref_field(object* obj, offset field, object* newFieldValue) {
    // Is the field we want to write to in a region targeted for Garbage
    // Collection?
    If (is_in_targeted_region(obj)) {
        // Evacuate the object.
        obj = evacuate(obj);}
    // Ensure the old contents of the field are scanned.
    enqueue(obj->getField(field));
    // Write the new value.
    obj->setField(newFieldValue);}
evacuate(object* obj) {
    If (obj->forwarding( ) == obj) {
```

-continued

```
        // speculative copy of object
        object* new_obj = allocate_and_copy(obj);
        // Attempt to CAS the forwarding pointer
        object* result = cas(obj->forwarding( ), obj, new_obj);
        // CAS succeeded, old value returned;
        If (result == obj)
            return new_obj;
        // CAS failed
        else {
            // Easy to do with Local Allocation Buffer
            rollback allocation( );
            // Return the current value of the location.
            return result;}
        // Someone else beat us to it.}
        else return obj->forwarding( );
```

III. Example Diagrams of Race Condition

FIGS. 3A-3D are diagrams illustrating objects stored in one or more regions of the heap, according to an embodiment. The heap may be partitioned into a plurality of regions that store one or more objects of a first type and one or more objects of a second type, where each object of the second type stores a memory address of an object of the first type. In an example, the objects of the first type are shared objects and the objects of the second type are reference objects.

At any one time, the heap may include one or more target collection regions 302, one or more destination regions 304, and one or more regions that is neither a target collection region nor a destination region. These designations may change in subsequent garbage collection cycles. Each shared object may have a corresponding reference object that references the most up-to-date location of the shared object. Accordingly, to access the shared object, a thread may read the memory address stored in the reference object corresponding to the shared object to access the most up-to-date version of the shared object.

A thread (e.g., garbage collector thread or mutator thread) may identify a plurality of regions of the heap storing one or more shared objects and one or more reference objects and be able to determine which region of the plurality is a target collection region, a destination region, and neither a target collection region nor a destination region. In an example, the thread determines a memory address of the object and determines, based on the determined memory address, whether the object is located in a target collection region of the heap, a destination region of the heap, or neither of these region types.

A. Object is Stored in a Target Collection Region of the Heap

Figure 3A:
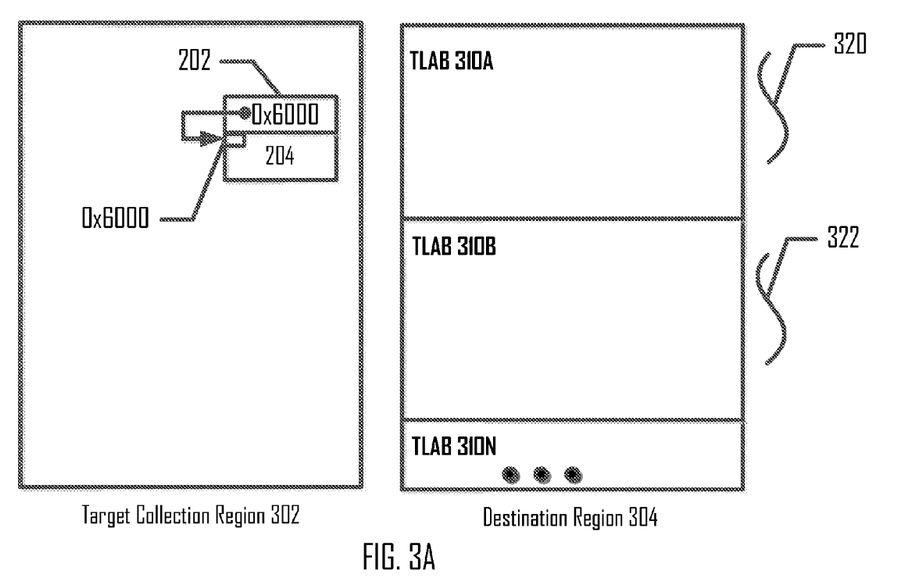
FIGS. 3A-3B are diagrams illustrating objects stored in one or more regions of the heap, according to an embodiment.

FIG. 3A is a diagram illustrating reference object 202 and shared object 204 stored in a target collection region of the heap, according to an embodiment. Reference object 202 stores a memory address of shared object 204 (e.g., memory address 0x6000), the most up-to-date location of shared object 204. One or more objects may be evacuated from the target collection region to the destination region of the heap while application 106 executes on computing device 104. A shared object that is marked as live and is stored in a target collection region of the heap will eventually be evacuated to a destination region of the heap.

Destination region 304 may be partitioned into one or more smaller regions called thread local allocation buffers (TLAB) that are each allocated to a thread. Destination region 304 includes TLAB 310A that is allocated to a thread 320, TLAB 310B that is allocated to a thread 322, and TLAB 310N that is allocated to a thread (not shown). When a thread fills up its TLAB, the thread is allocated another TLAB to store objects in the initial destination region. When the initial destination region is full, the thread may be allocated another TLAB in a destination region different from the initial destination region. As the program executes, the allocated regions may or may not be adjacent.

Because garbage collector and mutator threads are executing concurrently, the mutator thread may attempt to update shared object 204 while another thread (e.g., a garbage collector or mutator thread) is attempting to update and/or evacuate shared object 204 or the other thread may have already evacuated shared object 204 from target collection region 302 to destination region 304 of the heap. In FIG. 3A, a mutator thread may want to update shared object 204, which has not yet been evacuated to destination region 304. Updating an object may refer to writing to a field of the object. In an example, application-specific data 210 includes one or more fields and the mutator thread determines to update shared object 204 based on an instruction that updates a given field of application-specific data 210 in shared object 204. The determination to update may include identifying shared object 204 as an object on which to perform a write operation.

Threads 320 and 322 execute concurrently and each may update and/or attempt to evacuate objects from target collection region 302 to destination region 304. A thread that wants to update and/or evacuate shared object 204 may determine whether the memory address of shared object 204 is located in a target collection region. To determine the memory address of shared object 204, the thread reads an initial memory address of shared object's 204 location via reference object 202. The initial memory address is stored in reference object 202. Rather than perform the update to shared object 204 while it is located in target collection region 202, the thread performs a sequence of actions to ensure that any updates the thread makes to shared object 204 are not lost. When the initial memory address is determined to be located in target collection region 302, the thread may identify shared object 204 as an object to evacuate from target collection region 302 to destination region 304 of the heap.

B. Copy the Object to a Destination Region of the Heap

Figure 3B:
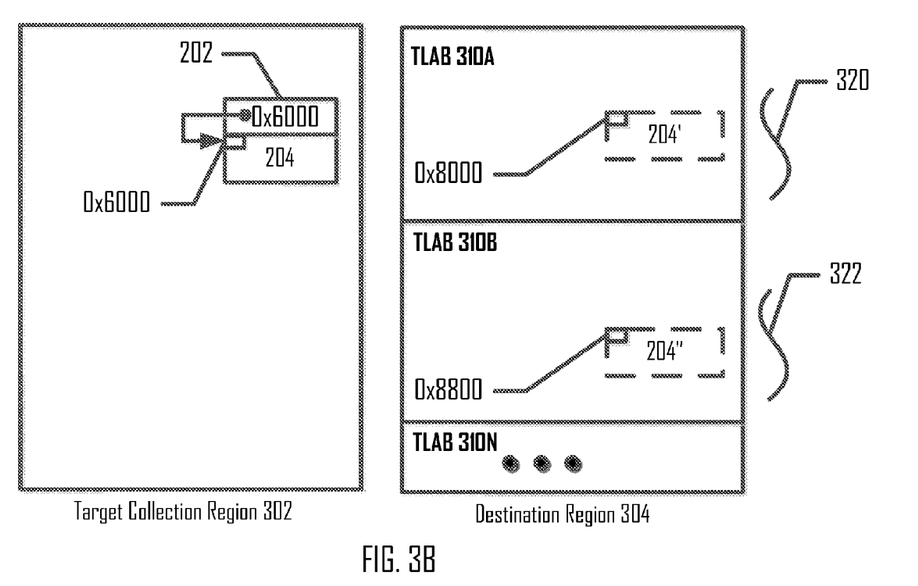

When the initial memory address of shared object 204 is determined to be located in a target collection region (e.g., target collection region 302), the thread stores a copy of shared object 204 in destination region 304 of the heap. FIG. 3B is a diagram illustrating threads 320 and 322 each storing their own copy of shared object 204 in a destination region of the heap, according to an embodiment. In FIG. 3B, thread 320's copy of shared object 204 is represented as shared object copy 204' and is stored at memory address 0x8000 in TLAB 310A of destination region 304, and thread 322's copy of shared object 204 is represented as shared object copy 204" and is stored at memory address 0x8800 in TLAB 310B of destination region 304. Shared object copies 204' and 204" are shown as dashed lines to indicate that these are speculative copies and may not be where the new version of shared object 204 will reside.

Thread 322 may be in a race with thread 320 to update the memory address stored in reference object 202 to point to that particular thread's copy of the shared object. In an example, thread 320 is a mutator thread that identifies shared object 204 as an object to update. Thread 322 may be another thread that executes concurrently with thread 320. In an example, thread 322 is a garbage collector thread that marks shared objects (e.g., shared object 204) as live objects and traverses the heap of live objects to evacuate them from a target collection region to a destination region of the heap. In another example, thread 322 is a mutator thread that identifies shared object 204 as an object to update.

After a thread stores its shared object copy in destination region 304, the thread may read a memory address stored in reference object 202 to determine the current memory address of shared object 204. If the thread wins the race, the memory address stored in reference object 202 matches the initial memory address of shared object 204 initially identified by the thread before it stored its copy of the shared object in the destination region. This may indicate to the thread that the most up-to-date version of shared object 204 remains in its initial location in the target collection region and no other thread has moved shared object 204. If the thread loses the race, the memory address stored in reference object 202 does not match the initial memory address of shared object 204 initially identified by the thread before it stored its copy of the shared object in the destination region.

In an embodiment, the thread executes a CAS atomic instruction on reference object 202 that compares the initial memory address of shared object 204 in the target collection region (before the thread stores its copy of the shared object in the destination region) to the current memory address of shared object 204 stored in reference object 202 (after the thread stores its copy of the shared object in the destination region), and when the initial memory address is determined to match the current memory address, the initial memory address stored in reference object 202 is updated with the memory address of the thread's shared object copy in the destination region. When the initial memory address is determined to not match the current memory address, the thread lost the race and the current value stored in reference object 202 is the new memory address of the shared object. The new memory address is the memory address of the winning thread's shared object copy in the destination region.

Figure 3C:
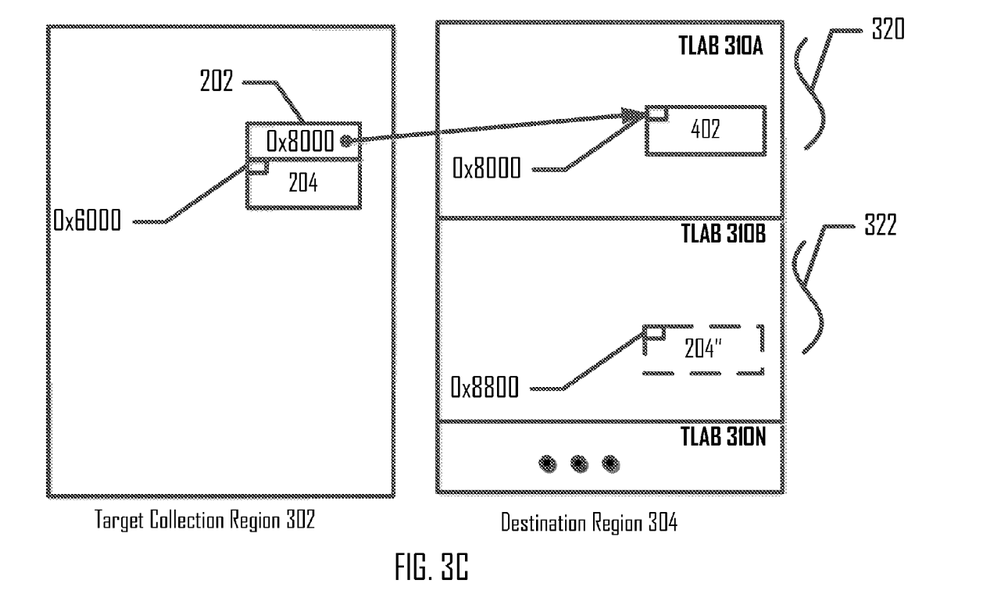
FIGS. 3C-3D illustrate a scenario in which a thread wins the race, according to an embodiment.
Figure 3D:
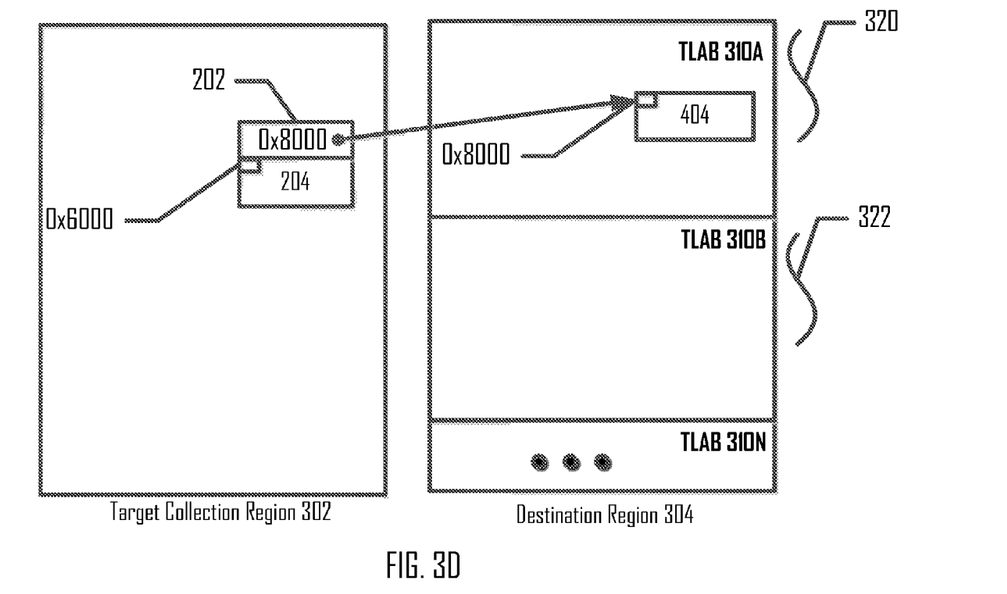
Figure 4A:
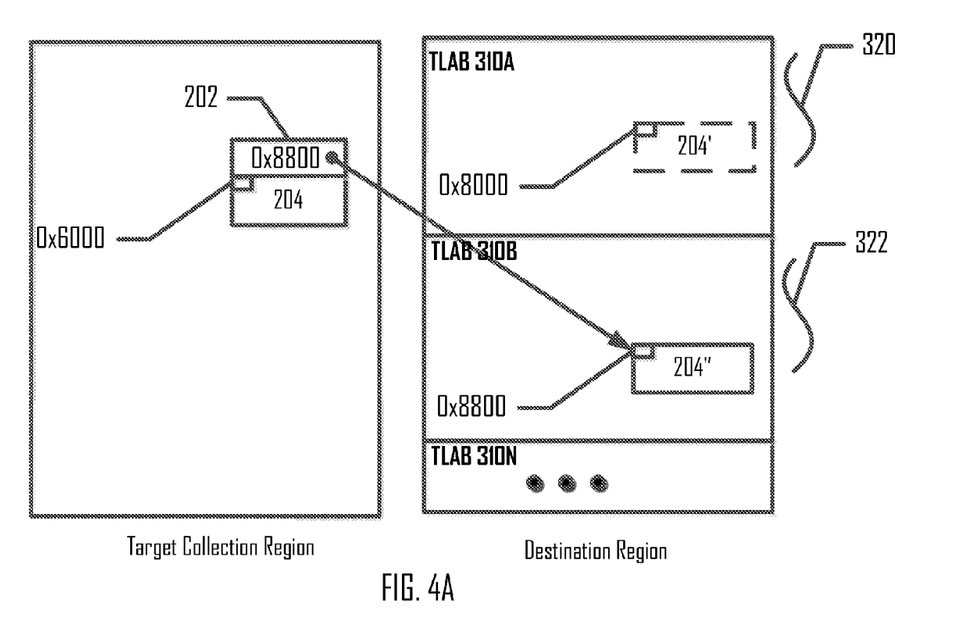
FIGS. 4A-4B illustrate a scenario in which a thread loses the race, according to an embodiment.
Figure 4B:
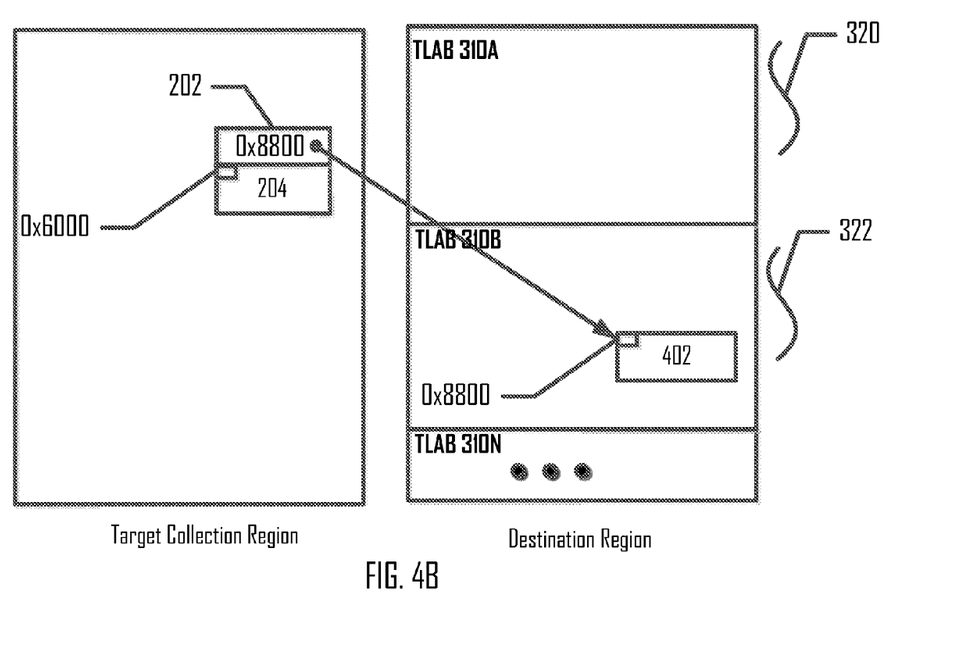

As discussed, threads 320 and 322 are in a race to update the memory address stored in reference object 202 with the memory address of that particular thread's shared object copy in destination region 304. The first thread to update the memory address stored in reference object 202 to store the memory address of that thread's copy wins the race, and the winning thread's copy in the destination region is used as the new shared object. FIGS. 3C-3D illustrate a scenario in which thread 320 wins the race, according to an embodiment. FIGS. 4A-4B illustrate a scenario in which thread 320 loses the race, according to an embodiment.

C. Thread 320 Wins the Race

1. Thread 320 Updates the Memory Address Stored in the Reference Object

The following is a description of thread 320. This description applies as well to thread 322. In FIG. 3B, thread 320 determines whether the initial memory address of shared object 204 in target collection region 302 (e.g., memory address 0x6000, the memory address of shared object 204 before thread 320 stores shared object copy 204' in destination region 304) matches the current memory address of shared object 204 stored in reference object 202 (the memory address of shared object 204 after thread 320 stores shared object copy 204' in destination region 304). The current memory address stored in reference object 202 is the memory address of the most up-to-date version of shared object 204.

Referring to FIG. 3B, when thread 320 reads the current memory address stored in reference object 202, the current memory address is 0x6000, which matches the initial memory address. When the initial memory address is determined to match the current memory address, thread 320 wins the race and updates the initial memory address stored in reference object 202 with the memory address of thread 320's shared object copy 204' in destination region 304, which is memory address 0x8000.

2. Thread 320 Updates the Shared Object in the Destination Region

In an example, thread 320 is a garbage collector thread that evacuates shared object 204 from the target collection region to the destination region of the heap and does not update shared object 204. In another example, thread 320 is a mutator thread that identifies shared object 204 as an object to update, evacuates shared object 204 from the target collection region to the destination region, and updates shared object copy 204' in the destination region.

FIG. 3C is a diagram illustrating the memory address in reference object 202 updated with the memory address of thread 320's shared object copy 204' and shared object copy 204' updated to shared object 402 (e.g., by a mutator thread), according to an embodiment. In such an example, winning thread 320 is a mutator thread that updates shared object copy 204' in destination region 304 to shared object 402. Shared object 402 is shown as being a solid line, indicating that shared object 402 is the most up-to-date version of shared object 204. Shared object 402 represents shared object 204 with the updates that thread 320 originally wanted to perform on shared object 204. Thread 320 may CAS reference object 202 such that it stores the memory address of shared object 402 and updates shared object copy 204' to shared object 402.

In an example, when the initial memory address of shared object 204 in the target collection region is determined to match the current memory address of shared object 204, thread 320 determines a field to update in shared object 204 to satisfy the write operation, determines a field offset of the field relative to the memory address of thread 320's shared object copy 204', (e.g., memory address 0x8000 in destination region 304), and updates the field in shared object 204' at the field offset relative to the memory address of thread 320's shared object copy 204' to determine new shared object 402.

3. Thread 320's Last-Known Memory Address of the Shared Object

Additionally, thread 320 may have a last-known memory address of shared object 204 that thread 320 uses to access shared object 204. The last-known memory address may be held in a stack location or in a field of another shared object different from shared object 204 (e.g., the other shared object has a reference to shared object 204). In an example, the last-known memory address of shared object 204 may be the last-known memory address of shared object 204 that the thread has in its stack. In an embodiment, when thread 320 determines that the initial memory address of shared object 204 in the target collection region matches the current memory address of the most up-to-date version of shared object 204, thread 320 may update its last-known memory address (e.g., in the thread's stack) with the current memory address of shared object 204. Accordingly, thread 320 may use the new memory address of shared object 204 rather than accessing the new memory address by using the old memory address of shared object 204, performing an indirect read of the new memory address of shared object 204 via reference object 202, and accessing shared object 204 at the read memory address.

In another embodiment, thread 320 does not update its last-known memory address to reflect the current memory address of the most up-to-date version of shared object 204. Rather, the thread may leave it up to the garbage collector to update the last-known memory address (e.g., in the thread's stack) of shared object 204. In such an embodiment, thread 320's last-known memory address of shared object 204 may be updated during the garbage collector's next mark phase.

4. Store a New Reference Object in the Destination Region

In an embodiment, when the initial memory address of shared object 204 in the target collection region is determined to match the current memory address of the most up-to-date version of shared object 204, the winning thread creates a new reference object that stores the new memory address of the shared object copy in the destination region. The reference object stores the memory address of the most up-to-date version of the shared object copy. The new memory address is the memory address of the winning thread's copy of the shared object in the destination region. The winning thread may store the new reference object in the destination region. In an example, the winning thread computes, based on the new memory address of the shared copy in the destination region, a memory address located in the destination region at which to store the new reference object. The winning thread may then store the new reference object at the computed memory address in the destination region. In an embodiment, the new reference object is stored adjacent to and precedes the winning thread's shared object copy in the destination region.

Managed runtime 102 may double word align objects. For example, objects may typically be stored at a double word boundary in memory. A word may be, for example, eight bytes. Although a word is described as being eight bytes, this is not intended to be limiting, and a word may be any quantity of bytes that is a multiple of four. Further, although managed runtime 102 is described as enforcing the double word alignment of objects, other embodiments that enforce different types of alignment of objects are within the scope of this disclosure.

In an embodiment, an object may be stored at a location in memory that is not at a double word boundary. In an example, managed runtime 102 aligns objects along a boundary, and the memory address of the new reference object does not start at an aligned boundary. This may be advantageous when the object that was last allocated, for example, has only three words and an extra word is free and unused in the last byte of the double word. Rather than leave the space unused, the new reference object may be stored at the unused space. In this way, space may be saved. A thread may identify a start of the new shared object at the double-word boundary and compute, based on the memory address of the new shared object, a memory address at which to store the new reference object. The location of the new reference object may be in the preceding double word boundary relative to the location of the new shared object. An object may refer to data content and may not necessarily be an object that is double word aligned.

In an embodiment, the winning thread identifies a most recently allocated object stored on the heap and determines a size of unused space between an end of the most recently allocated object and a next alignment boundary of the heap. The thread may determine whether a size of the new reference object exceeds the determined size of unused space. When the size of the new reference object is determined to not exceed the determined size of unused space, the winning thread may store the new reference object in the unused space such that the memory address of the new reference object does not start at an aligned boundary. In such an example, the new reference object is stored at a boundary preceding the new shared object and stores a memory address of the new shared object.

5. Thread 322 Uses Thread 320's Copy in the Destination Region

After thread 320 updates the memory address in reference object 202 to reflect the new memory address of shared object 402 in destination region 304, thread 322 reads the current memory address stored in reference object 202 and determines whether the initial memory address of shared object 204 in target collection region 302 (e.g., memory address 0x6000, which is the memory address of shared object 204 before thread 322 stores shared object copy 204" in destination region 304) matches the current memory address of shared object 204.

In FIG. 3C, thread 320 has already updated the initial memory address stored in reference object 202 (memory address 0x6000) with the shared object's new memory address 0x8000 in destination region 304. As such, when thread 322 reads the current memory address 0x8000 stored in reference object 202, thread 322 determines that the initial memory address does not match the current memory address of stored object 204. When the initial memory address is determined to not match the current memory address, thread 322 may identify memory address 0x8000 as being the new memory address of the shared object (e.g., shared object 402). In an example, thread 322 is a mutator thread that updates shared object 402 to determine a shared object 404 at the new memory address. Shared object 404 represents shared object 402 with the updates that the mutator thread originally wanted to perform on shared object 204. FIG. 3D is a diagram illustrating shared object 402 being updated to shared object 404, according to an embodiment.

B. Thread 320 Loses the Race

1. Thread 322 Updates the Memory Address Stored in the Reference Object

Referring back to FIG. 3B, each of threads 320 and 322 has stored its own copy of shared object 204 in the TLAB allocated to the respective thread. Thread 322 may be the winning thread by executing the actions described above. For example, thread 322 may determine whether the initial memory address of shared object 204 in target collection region 302 (e.g., memory address 0x6000, the memory address of shared object 204 before thread 322 stores shared object copy 204" in destination region 304) matches the current memory address of shared object 204 stored in reference object 202 (the memory address of shared object 204 after thread 322 stores shared object copy 204" in destination region 304). In FIG. 3B, when thread 322 reads the current memory address stored in reference object 202, the current memory address is 0x6000, which matches the initial memory address. When the initial memory address is determined to match the current memory address, thread 322 wins the race and updates the initial memory address stored in reference object 202 with the memory address of thread 322's shared object copy 204" in destination region 304, which is memory address 0x8800. FIG. 4A is a diagram illustrating the memory address stored in reference object 202 being updated with the memory address of thread 322's shared object copy 204", according to an embodiment.

In an example, thread 322 is a mutator thread that identifies shared object 204 as an object to update, evacuates shared object 204 from the target collection region to the destination region, and updates shared object copy 204" in the destination region. In another example, thread 322 is a garbage collector thread that evacuates shared object 204 from the target collection region to the destination region and does not update shared object 204. In FIG. 4A, the memory address stored in reference object 202 is updated with the memory address of thread 322's shared object copy 204" and shared object copy 204" is not changed from shared object 204. Shared object copy 204" is shown as being a solid line, indicating that shared object copy 204" is the most up-to-date version of shared object 204. Thread 322 may CAS reference object 202 such that it stores the memory address of shared object 204".

As discussed, thread 320 may have a last-known memory address of shared object 204 that thread 320 uses to access shared object 204. In an embodiment, when thread 320 determines that the initial memory address of shared object 204 in the target collection region does not match the current memory address of the most up-to-date version of shared object 204, thread 320 may update its last-known memory address (e.g., in the thread's stack) with the current memory address of shared object 204. In an example, the current memory address is the memory address of thread 322's copy of the shared object in destination region 304 (e.g., memory address 0x8800).

2. Thread 320 Uses Thread 322's Copy in the Destination Region

After thread 322 updates the memory address in reference object 202 to reflect the new memory address of shared object 204 in destination region 304, thread 320 reads the current memory address stored in reference object 202 and determines whether the initial memory address of shared object 204 in target collection region 302 (e.g., memory address 0x6000, the memory address before thread 320 stores shared object copy 204' in destination region 304) matches the current memory address of shared object 204.

In FIG. 4A, thread 322 has already updated the initial memory address stored in reference object 202 (memory address 0x6000) with the shared object's new memory address 0x8800 in destination region 304. As such, when thread 320 reads the current memory address (e.g., memory address 0x8800) stored in reference object 202, thread 320 determines that the initial memory address does not match the current memory address of stored object 204. When the initial memory address is determined to not match the current memory address, thread 320 may identify memory address 0x8800 as being the new memory address of shared object 204. When the initial memory address is determined to not match the current memory address, shared object 204 may have already been evacuated from target collection region 302 to destination region 304 by, for example, a mutator thread or a garbage collector thread. Thread 320's copy of shared object may not actually take up space in TLAB 310A, and thread 320 may back up in TLAB 310A and allocate space at memory address 0x8000 in the destination region for another object.

In an example, thread 320 is a garbage collector thread that evacuates shared object 204 from the target collection region to the destination region of the heap and does not update shared object 204. In another example, thread 320 is a mutator thread that identifies shared object 204 as an object to update, evacuates shared object 204 from the target collection region to the destination region of the heap, and updates shared object copy 204" in the destination region.

FIG. 4B is a diagram illustrating the memory address in reference object 202 updated with the memory address of thread 322's shared object copy 204" and shared object copy 204' updated to shared object 402 (e.g., by a mutator thread), according to an embodiment. In such an example, thread 320 is a mutator thread that updates shared object copy 204" in destination region 304 to shared object 402. Shared object 402 represents shared object 204" with the updates that thread 320 originally wanted to perform on shared object 204.

In an example, when the initial memory address of shared object 204 in the target collection region is determined to not match the current memory address of shared object 204, thread 320 determines a field to update in shared object 204 to satisfy the write operation, determines a field offset of the field relative to the memory address of thread 322's shared object copy 204" (e.g., memory address 0x8800 in destination region 304), and updates the field in shared object 204' at the field offset relative to the memory address of thread 322's shared object copy 204" to determine new shared object 402.

As discussed above and further emphasized here, FIGS. 1, 2, 3A-3D, and 4A-4B are merely examples, which should not unduly limit the scope of the claims. For example, it should be understood that a managed runtime may execute more than one application on a computing device. Additionally, although the memory address of reference object 202 has been described as preceding and being adjacent to the memory address of shared object 204, this is not intended to be limiting. Rather, reference object 202 may be stored at a location relative to shared object 204 such that a thread may determine the location of reference object 202.

Further, computing device 104 may include a comparison module and an update module. In an embodiment, the comparison module identifies a shared object (e.g., shared object 204) to evacuate from the target collection region to the destination region, reads an initial memory address stored in a reference object corresponding to the shared object (e.g., reference object 204), and stores a copy of shared object 204 at a memory address in the destination region. The initial memory address is a memory address of shared object 204 located in target collection region 304. After the copy is stored in the destination region, the comparison module reads a current memory address of shared object 204 stored in reference object 202 and determines whether the initial memory address matches the current memory address. The current memory address is a memory address of the most up-to-date version of shared object 304. In embodiment, when the initial memory address is determined to match the current memory address, the update module updates the initial memory address stored in reference object 202 with the current memory address. A thread (e.g., mutator thread or garbage collector thread) may execute the comparison and update modules.

Moreover, computing device 104 may be coupled to a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

IV. Example Method

Figure 5:
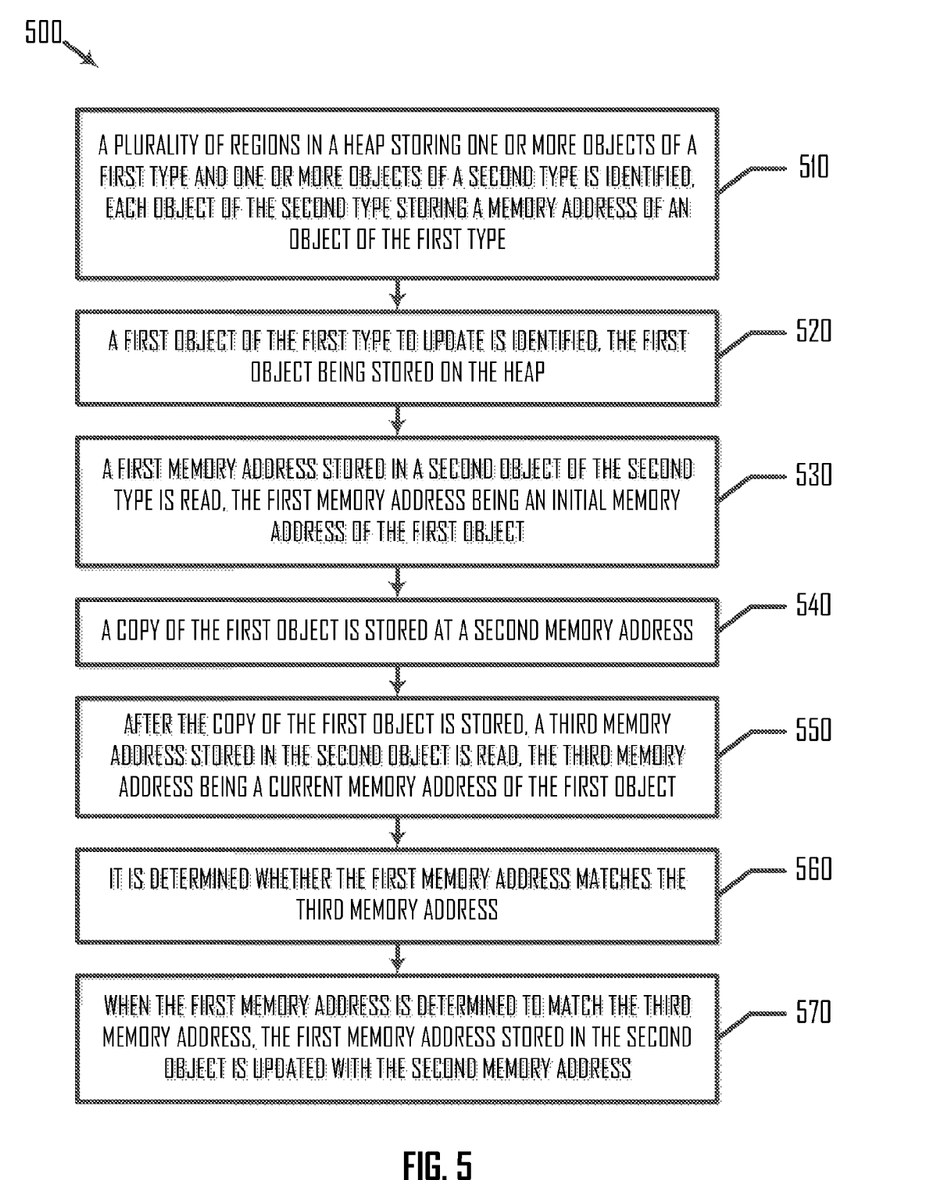
FIG. 5 is a flowchart illustrating a method of managing memory, according to an embodiment.

FIG. 5 is a flowchart illustrating a method 500 of managing memory, according to an embodiment. Method 500 is not meant to be limiting and may be used in other applications.

In FIG. 5, method 500 includes actions 510-570. In an action 510, a plurality of regions in a heap storing one or more objects of a first type and one or more objects of a second type is identified, each object of the second type storing a memory address of an object of the first type. In an example, a mutator thread identifies a plurality of regions in a heap storing one or more objects of a first type and one or more objects of a second type, each object of the second type storing a memory address of an object of the first type. The objects of the first type may be shared objects, and the objects of the second type may be reference objects.

In an action 520, a first object of the first type to update is identified, the first object being stored on the heap. In an example, a mutator thread identifies a first object of the first type to update, the first object being stored on the heap. In an action 530, a first memory address stored in a second object of the second type is read, the first memory address being an initial memory address of the first object. In an example, a mutator thread reads a first memory address stored in a second object of the second type, the first memory address being an initial memory address of the first object. In an action 540, a copy of the first object is stored at a second memory address. In an example, a mutator thread stores a copy of the first object at a second memory address.

In an action 550, after the copy of the first object is stored, a third memory address stored in the second object is read, the third memory address being a current memory address of the first object. In an example, after the copy of the first object is stored, a mutator thread reads a third memory address stored in the second object, the third memory address being a current memory address of the first object. In an action 560, it is determined whether the first memory address matches the third memory address. In an example, a mutator thread determines whether the first memory address matches the third memory address. In an action 570, when the first memory address is determined to match the third memory address, the first memory address stored in the second object is updated with the second memory address. In an example, when the first memory address is determined to match the third memory address, a mutator thread updates the first memory address stored in the second object with the second memory address.

It is also understood that additional method actions may be performed before, during, or after actions 510-570 discussed above. It is also understood that one or more of the actions of method 500 described herein may be omitted, combined, or performed in a different sequence as desired.

V. Example Computing System

Figure 6:
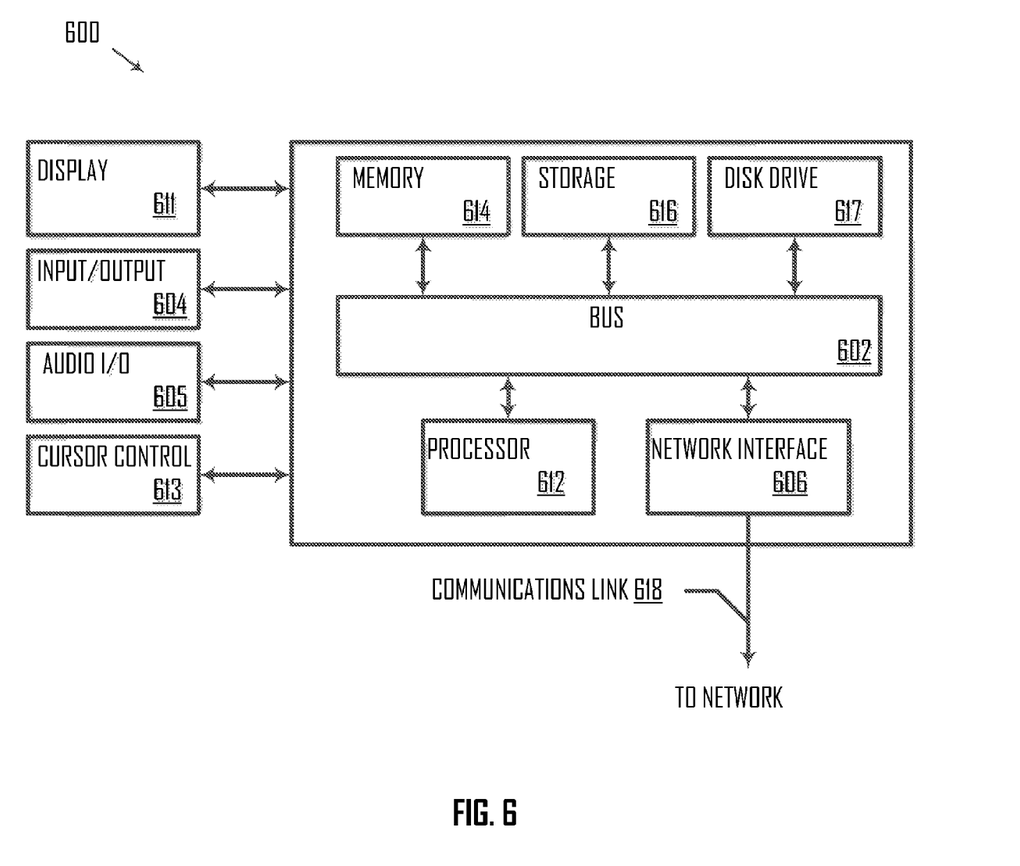
FIG. 6 is a block diagram of a computer system suitable for implementing one or more embodiments of the present disclosure

FIG. 6 is a block diagram of a computer system 600 suitable for implementing one or more embodiments of the present disclosure. In various implementations, computing device 104 may include a client or a server computing device. The client or server computing device may include one or more processors. Computer system 600 may include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or a server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. The heap may be allocated from system memory component 614, and the shared objects and the reference objects may be stored on the heap.

Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, memory cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of managing memory, the method comprising:
    identifying, by a thread, a plurality of regions in a heap storing one or more objects of a first type and one or more objects of a second type, the plurality of regions including a target collection region and a destination region;
    identifying a first object of the first type stored in the target collection region of the heap;
    reading an initial memory address of the first object, the initial memory address being stored in a second object of the second type;
    storing a copy of the first object at a first memory address located in the destination region;
    after the storing, reading a current memory address of the first object, the current memory address being stored in the second object;
    determining whether the initial memory address matches the current memory address; and
    in response to a determination that the initial memory address matches the current memory address, updating, by the thread, the initial memory address stored in the second object with the first memory address, wherein the second object references the copy of the first object located in the destination region; and
    in response to a determination that the initial memory address does not match the current memory address, updating, by the thread, a most up-to-date copy of the first object in accordance with satisfying a write operation, the most up-to-date copy of the first object being stored at the current memory address in the destination region, and the current memory address being different from the first memory address.

2. The method of claim 1, further comprising:
determining, by the thread, whether the initial memory address is located in the target collection region, wherein identifying the first object includes in response to a determination that the initial memory address is located in the target collection region, identifying, by the thread, the first object as an object to evacuate from the target collection region to the destination region of the heap.

3. The method of claim 2, further comprising:
in response to a determination that the initial memory address matches the current memory address, updating a last-known memory address with the first memory address; and
in response to a determination that the initial memory address does not match the current memory address, updating the last-known memory address with the current memory address,
wherein the thread uses the last-known memory address to access the first object.

4. The method of claim 2, wherein the thread is a mutator thread, the method further comprising:
updating, by the mutator thread, the copy of the first object at the first memory address in the destination region in accordance with satisfying a write operation, wherein determining whether the initial memory address matches the current memory address includes after updating the copy of the first object, determining whether the initial memory address matches the current memory address.

5. The method of claim 2, wherein the thread is a first mutator thread, and the storing includes storing the first copy of the first object to a thread local allocation buffer (TLAB) allocated to the first mutator thread, the method further comprising:
identifying, by a second mutator thread, the first object of the first type as an object to evacuate from the target collection region to the destination region;
reading, by the second mutator thread, the initial memory address stored in the second object of the second type;
storing, by the second mutator thread, a second copy of the first object at a second memory address of a second TLAB located in the destination region, the second TLAB being allocated to the second mutator thread;
updating, by the second mutator thread, the second copy of the first object at the second memory address;
after the updating the storing a second copy, reading a second current memory address of the first object, the second current memory address being stored in the second object;
determining whether the initial memory address matches the second current memory address;
in response to a determination that the initial memory address matches the second current memory address, updating the initial memory address stored in the second object with the second memory address; and
in response to a determination that the initial memory address does not match the second current memory address, updating the first copy of the first object at the first memory address in the destination region.

6. The method of claim 1, wherein the determining whether the initial memory address matches the current memory address and the updating includes executing an atomic instruction on the second object that compares the initial memory address to the current memory address, wherein executing the atomic instruction includes in response to the determination that the initial memory address matches the current memory address updating the initial memory address stored in the second object with the first memory address.

7. The method of claim 1, further comprising:
in response to the determination that the initial memory address matches the current memory address, creating a third object of the second type, the third object storing the first memory address of the copy of the first object;
computing, based on the first memory address, a second memory address located in the destination region; and
storing the third object at the second memory address in the destination region.

8. The method of claim 7, wherein the third object is adjacent to and precedes the copy of the first object in the destination region.

9. The method of claim 7, wherein the first object includes application data and management data, the management data is used by a managed runtime to manage the application data, and the managed runtime aligns objects along a boundary, the method further comprising:
identifying a most recently allocated object stored on the heap;
determining a size of unused space between an end of the most recently allocated object and a next alignment boundary on the heap; and
determining whether a size of the third object exceeds the determined size of unused space, wherein the storing the third object includes in response to a determination that the size of the third object does not exceed the determined size of unused space, storing the third object in the unused space.

10. A system for managing memory, the system comprising:
a memory including a heap, wherein the heap is partitioned into a plurality of regions and stores a set of objects of a first type and a set of objects of a second type, and the plurality of regions includes a target collection region and a destination region;
a comparison module that identifies a first object of the first type to evacuate from the target collection region to the destination region, reads a first memory address stored in a second object of the second type, stores a copy of the first object at a second memory address in the destination region, and updates the copy of the first object at the second memory address in accordance with a write operation, wherein the first memory address is an initial memory address of the first object located in the target collection region,
wherein after the copy is updated, the comparison module reads a third memory address stored in the second object and determines whether the first memory address matches the third memory address, wherein the third memory address is a current memory address of the first object; and
an update module that in response to a determination that the first memory address matches the third memory address, updates the first memory address stored in the second object with the second memory address,
wherein in response to a determination that the first memory address does not match the third memory address, the update module accesses a most up-to-date copy of the first object located at the third memory address and updates the most up-do-date copy of the first object in accordance with the write operation.

11. The system of claim 10, further comprising:
a mutator thread that executes the comparison and update modules, wherein the mutator thread determines to update the first object.

12. The system of claim 11, wherein when the first memory address is determined to not match the third memory address, the first object has been evacuated from the target collection region to the destination region by a second mutator thread.

13. The system of claim 11, wherein when the first memory address is determined to not match the third memory address, the first object has been evacuated from the target collection region to the destination region by a garbage collector thread.

14. A non-transitory machine-readable medium comprising a plurality of machine-readable instructions that when executed by one or more processors is adapted to cause the one or more processors to perform a method comprising:
identifying a plurality of regions in a heap storing one or more objects of a first type and one or more objects of a second type, each object of the second type storing a memory address of an object of the first type;
identifying a first object of the first type to update, the first object being stored on the heap;
reading a first memory address stored in a second object of the second type, the first memory address being an initial memory address of the first object;
storing a first copy of the first object at a second memory address;
modifying one or more fields in the first object stored at the second memory address in accordance with a write operation;
after the updating, reading a third memory address stored in the second object, the third memory address being a current memory address of the first object;
determining whether the first memory address matches the third memory address;
in response to a determination that the first memory address matches the third memory address, updating the first memory address stored in the second object with the second memory address; and
in response to a determination that the first memory address does to not match the third memory address, updating in accordance with the write operation a most up-to-date copy of the first object stored at the third memory address.

15. The method of claim 1, wherein the thread is a garbage collector thread.

16. The method of claim 4, wherein the first object includes application data including one or more fields, and wherein updating the copy of the first object includes:
determining, by the mutator thread, a field to update in the copy of the first object in accordance with satisfying the write operation;
determining a field offset of the field relative to the first memory address; and
updating, by the mutator thread, the field in the first object at the field offset relative to the first memory address.

17. The method of claim 1, wherein the first object includes application data including one or more fields, and wherein updating the most up-to-date copy of the first object includes:
determining, by the mutator thread, a field to update in the most up-to-date copy of the first object in accordance with satisfying the write operation;
determining a field offset of the field relative to the current memory address; and
updating, by the mutator thread, the field in the first object at the field offset relative to the current memory address.

18. The method of claim 5, wherein if the initial memory address does not match the second current memory address, the second current memory address matches the first memory address.

19. The method of claim 4, wherein the initial memory address does not match the current memory address.

* * * * *

UNITED STATES PATENT AND TRADEMARK OFFICE
CERTIFICATE OF CORRECTION

PATENT NO. : 9,767,019 B2
APPLICATION NO. : 14/029544
DATED : September 19, 2017
INVENTOR(S) : Christine H. Flood Page 1 of 1

It is certified that error appears in the above-identified patent and that said Letters Patent is hereby corrected as shown below:

In the Claims

Column 19, Line 47, Claim 5 delete "storing a".

Signed and Sealed this
Twenty-seventh Day of March, 2018

Andrei Iancu
*Director of the United States Patent and Trademark Office*